Dec. 27, 1938.   P. H. BREHM   2,141,164
AUTOMATIC CLUTCH
Filed Aug. 17, 1933
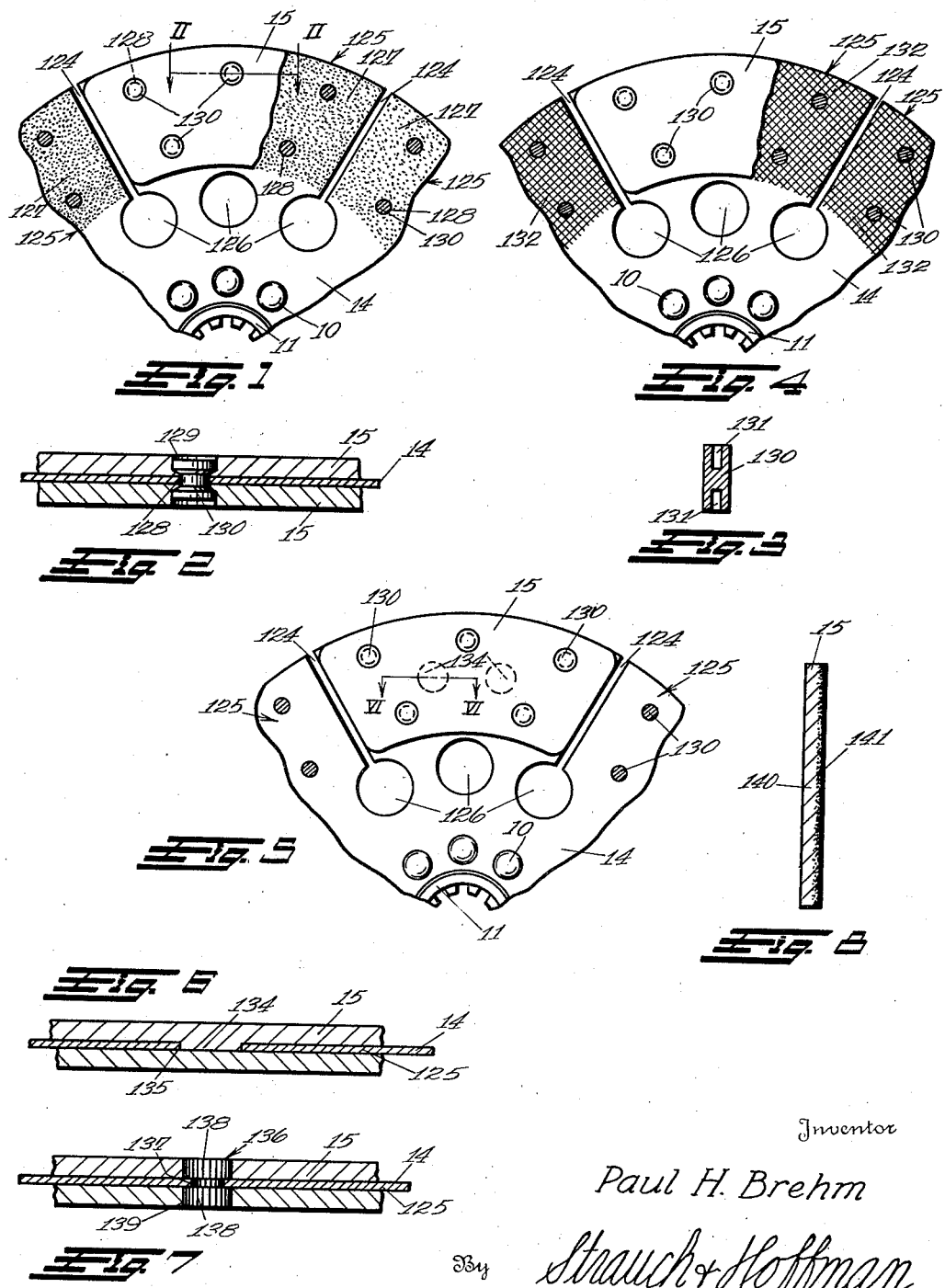
Inventor
Paul H. Brehm
By Strauch & Hoffman
Attorneys Patented Dec. 27, 1938

2,141,164

UNITED STATES PATENT OFFICE 2,141,164

AUTOMATIC CLUTCH

Paul H. Brehm, Kent, Ohio, assignor to Automatic Drive & Transmission Company, Gloucester City, N. J., a corporation of New Jersey Application August 17, 1933, Serial No. 685,603

2 Claims. (Cl. 192—107)

This invention relates generally to novel drive mechanisms as employed in connection with the transmission of power from a driving element to a driven element and more particularly to slipping drives as embodied in automatic clutch mechanisms.

Prior type of drive mechanisms have embodied linings and frictional elements, characterized by several outstanding disadvantages which have been even more pronounced when such linings have been employed in connection with modern types of automatic clutches, especially those of the types where a certain amount of slippage between the linings and the cooperating contacting members takes place during certain phases of their operation. Prior types of linings and frictional elements have embodied binding materials such as cements and resins which lend substantially no beneficial effect to the elements as regards their frictional characteristics, but which have been found to be exceedingly susceptible to changes in temperature of the clutch mechanism during its operation and have been found to cause uncertain and eccentric changes in the coefficient of friction of the clutch linings. Changes in the coefficient of friction of automatic clutch facings or linings, unless confined within very small ranges, militate against the proper operation of automatic clutches, and produce excessive slippage on one hand, or a harsh and grabbing action on the other. As such clutches must be adjusted and set for a relatively definite range of coefficient a marked deviation from the range renders it impossible to establish or maintain proper operation thereof. Some binders have proven utterly non-resistant to the heat developed in a clutch during normal operation especially in clutches involving a relatively large amount of slipping of the contacting elements, and accordingly gradual disintegration of the linings has taken place with a distribution of the particles throughout the clutch and a material change in the coefficient of friction of the clutch facings.

A further disadvantage of prior linings, which has also led to unforeseen and radical changes in the coefficient of friction while in operation, is the difficulty that has been hitherto experienced in controlling the manufacture or processing of such linings to obtain a uniform and satisfactory product at all times. It has been difficult to control the characteristics of the different materials necessary for practical and satisfactory friction linings so that a uniform product having a predetermined range of coefficient of friction could be obtained which could be depended upon to maintain that range under all conditions.

Prior clutch facings of the conventional high coefficient types have proven unsatisfactory in automatic clutch operation. Since the invention of Heinrich, United States Patent No. 1,979,880 issued November 6, 1934, clutches wherein there is a certain amount of slipping between the driving and the driven elements are recognized to be essential so that the driving element can smoothly reach a sufficiently high speed to satisfactorily handle the load before a substantially positive or non-slipping connection is effected. Such slippage has a tendency to develop heat which must be properly dissipated, and in the case of prior high coefficient facings employing binders, the binders have been found to be seriously affected by the developed heat, the result being that the range of the coefficient of friction is materially altered and oftentimes the binder disintegrates, in turn causing a breakdown of the facing. It has been found that automatic clutches constructed of materials heretofore generally used in the manufacture of manually operated clutches, and subjected to pressures of the same order as those to which the manually operated clutches are subjected, do not operate satisfactorily in automatic assemblies, due to excessive wear, scarring and the like, which limit the life of the clutch to but a few thousand miles at best. Inasmuch as the temperatures of the clutch elements rise when slippage takes place, as is now contemplated in automatic clutches, since the above invention, the characteristics of the clutch have a tendency to change, and smooth and even transmission of power from the driving shaft to the driven shaft cannot be effected. Either excessive or undesired slipping results, or the clutch exhibits a tendency to suddenly fixedly grip the driving and driven shafts in a substantially positive connection, resulting in ojectionable chatter and the placing of heavy strains upon the power plant as well as upon the clutch and its associated load.

Numerous types of clutch material have been tried since the above referred to invention in an effort to develop an automatic clutch that would give the smoothest and most even transmission of power from the driving to the driven shaft, while permitting slippage between the driving and the driven shaft as the load is being assumed by the driving shaft, and varying pressures and lubricating methods have been experimented with with the view of developing such smooth and even transmission of power, and at the same time provide the desired non-slipping engagement between the clutch elements when the power plant is operating at a speed at which it delivers sufficient torque to overcome the load incident to the movement of the vehicle upon grades or due to acceleration, or simply to overcoming the resistance to the movement of the parts thereof. It has been found that if the clutch materials are properly selected and combined, the clutch elements properly designed and assembled, the automatically applied clutch pressures properly controlled, that an automatic clutch permitting the slippage necessary to give an absolutely smooth performance can be provided that has a life equal to, or greater than, the life of an ordinary manually operated clutch such as are now in wide use in motor driven vehicles and in similar relations.

One type of clutch material that has been found to operate most satisfactorily in clutches of the automatic type is one in which heat resisting lubricant is evenly distributed throughout and which is characterized by a relatively low coefficient of friction. Such a material is disclosed in application, Serial No. 631,084 filed August 30, 1932, by Charles B. Heinrich. The material described therein is particularly characterized by a very low coefficient of friction at low engaging pressures with a uniformly increasing coefficient as the pressures increase, so that at low engaging pressures and during intermittent engagement, loss of energy and generation of heat is minimized, and at higher pressures and speeds slippage is eliminated.

The desired smoothness and uniform variation of coefficient as the clutch pressures vary may be obtained, as described in the above application, by utilizing a large quantity of lubricant such as graphite or like material in combination with fibrous material and a binder, if desired, so that the smoothness of the element is increased at the same time that its self-lubricating properties are enhanced. As an improvement thereon, the present invention contemplates a clutch material formed with a lubricant such as graphite, lead, or similar material in combination with a suitable metal as a base, and no necessity exists for either the use of a fibrous material or a binder. Such a clutch element has been found to exhibit substantially uniform characteristics under varying conditions of service irrespective of temperature changes, and permits varied degrees of smooth slipping without injury though the higher gears be used in starting an automobile to which this invention is applied.

The primary object of this invention accordingly is to provide an automatic clutch having a novel frictional element capable of successfully and smoothly transmitting power from a driving member to a driven member and permitting the even slipping of the elements as the speeds of the driving and driven members increase, until a sufficiently high point has been reached on the speed torque curve of the power plant connected to the driving member where the power plant can handle the load imposed upon it in direct engagement whereupon the frictional elements afford means for a positive drive and there is no slipping, this characteristic involving a uniform increase in the coefficient of friction in substantially direct proportion to the increase in pressure upon the frictional element.

A further object of the invention is to provide a clutch facing for an automatic clutch designed to withstand deliberately repeated slipping without change in its operating characteristics at any time, and having an extraordinary long life to the end that the clutch continues indefinitely, capable of smoothly picking up the load and at the same time frictionally holding the clutch elements in a non-slipping engagement when the clutch should be engaged.

Still a further object of my invention is to provide a frictional element applicable to an element such as a clutch plate or the like, the operative face of the frictional element being characterized by a desired low coefficient of friction and the face contacting with the supporting element being characterized by a relatively high coefficient of friction whereby the high coefficient of friction assists in preventing relative movement between the elements.

A further object of my invention is the provision of a clutch, or like assembly, in combination with a frictional lining or face having a relatively low coefficient of friction, a material having a relatively high coefficient of friction being interposed between the contacting faces of the lining and the clutch or like element whereby relative movement or slippage between the clutch and its facing is prevented.

Still a further object of my invention is to provide a novel arrangement for securing a frictional element or lining, particularly one of the metallic type, to a base such as a clutch element wherein the lining is securely maintained in place against slipping, and cracking or shearing thereof adjacent the fastening means is eliminated.

A further object of my invention is to provide a novel arrangement for securing a metallic frictional face or lining to a clutch element wherein substantially exact aligned apertures are provided in the elements to be secured together, novel fastening means being provided therein which securely maintain the elements in place against slippage or relative movement therebetween and do not interfere with the normal operation of the clutch or like assembly.

Still a further object of my invention is the provision of a novel arrangement for mounting a metallic frictional face or lining to a clutch wherein means to prevent relative movement or slippage therebetween is formed integral with the units being assembled to offer a maximum resistance to shearing forces.

With the above and other objects of my invention in view which will become evident as the description thereof proceeds, reference is made to the accompanying drawing wherein:

Figure 1 is a plan view of a portion of a clutch plate assembled in a manner and with the face or lining of my invention, portions of the lining being omitted to illustrate more clearly the manner of fastening;

Figure 2 is an enlarged section taken on the line II—II of Figure 1 illustrating in detail the manner of fastening the face or lining to the clutch plate;

Figure 3 is a detailed enlarged view of an embodiment of the fastening element employed in connection with my invention;

Figure 4 is a view similar to Figure 1 but illustrating another preferred embodiment of my invention wherein a different arrangement for preventing relative movement between the parts is employed;

Figure 5 is also a view similar to that of Figure 1 and illustrating still a further preferred embodiment of the fastening or securing means of my invention;

Figure 6 is a section taken on the line VI—VI of Figure 5 illustrating a further preferred method of securing the face or lining to the clutch or similar element;

Figure 7 is a section of a further improved type of clutch or brake assembly wherein a method of fastening, embodying the principles of my invention is illustrated; and Figure 8 is a section through a face or lining of my invention illustrating the manner of forming the same with opposite faces possessing different coefficient of frictions whereby a low coefficient lining may be mounted in such a manner as to insure against its slippage relative to the element upon which it is mounted.

Referring to the drawing wherein like reference characters refer to like parts throughout the several views thereof, the automatic clutch mechanism disclosed is preferably enclosed in a suitable clutch housing which is not shown for the sake of simplicity.

Referring to Figure 1, a driven clutch plate or disc 14 is provided with a hub 11 suitably secured thereto, as by rivets 10. Hub 11 is splined for mounting upon a shaft to be driven (not shown).

Concerning the clutch facings preferably employed in my invention and with specific reference to Figure 1, 15 designates a facing or lining formed in accordance with the principles of this invention. This lining is of the metallic type since it is preferably composed in the main of a soft metal such as copper or the like of a unique and novel structure, particularly as regards frictional elements. It has been found that common forms of metal are unsuited for the purpose of a clutch or like assembly inasmuch as the particles are much too heavy and impart an undesirable amount of weight to the clutch plate which in turn causes it to acquire considerable momentum when being driven. Accordingly, when it is disengaged from the driving means for the purpose of shifting gears, the clutch plate has a tendency to continue rotating at a rapid rate and considerable difficulty is experienced in shifting. Moreover, control cannot be so well exercised in processing and the elements formed therefrom are of a more or less unpredeterminable coefficient of friction.

In overcoming this disadvantage, which has been a prime obstacle in the development of such linings or facings, I have found that the metal chosen, when prepared in flocculent powder form as by electro-chemical processes, has a density from one-quarter to one-half as great as that of the ordinary forms of such powder and when utilized in a clutch lining or facing, and it reduces the momentum of the clutch after disengagement a corresponding amount. Moreover, since this powder is characterized by a greater degree of homogeneity and capacity for combining with other substances than powdered metal as heretofore known, it has enabled facings or linings of a frictional type to be formed therefrom without the necessity of the addition of a binding material. This accomplishes a further reduction in weight and moreover permits a more accurate control of the final characteristics of the material since the binding material and its consequent effect is eliminated. These characteristics of the powder have been found to persist in any form of subdivision, the particles being soft to the touch, and collectively possessing to a very high degree the quality of "felting" or self-matting upon compression.

Metal powder as described may be produced by grinding, by disintegration in an acid process or by electrolytic methods, the latter being preferable. When so formed electrolytically, the powder, as for instance copper powder, has been found to possess a density of from 10 to 20 grams per cubic inch, whereas usual forms of powder average about 40 grams per cubic inch. Moreover the individual particles of the powder, when so formed, have been found to possess a unique feathery structure wherein portions of the particles are not combined within close dimensions as might be expected but project in the form of long arms having prongs or tentacles extending therefrom in a plurality of directions. The particles, upon intermingling, collectively, constitute a somewhat cohesive flour-like mass, and upon compression intertwine and mat with each other to produce a rigid and tenacious product.

The metal powder thus formed is preferably mixed with a predetermined quantity of a solid lubricant such as graphite or lead, the latter also preferably being formed as a flocculent powder of the same physical structure as the copper powder, although it is to be understood that any state of the lubricant in a finely divided condition is satisfactory. While the copper particles of the structure described have shown themselves to be capable of combining with almost any other solid ingredient in any form to produce a substantially rigid product without the necessity of employing a binder, the formation of the additional ingredient or ingredients of substantially the same physical structure of the copper powder provides even a more secure binding between the individual particles, the result being a solid compact smooth-faced structure which holds together under all conditions normally experienced in clutches of all types and is particularly adapted for use in clutches wherein a lining capable of permitting a graduated amount of slipping proportional to the pressures applied is desirable.

The specific proportions of the copper and other ingredients employed, such as graphite, lead or tin, is entirely dependent upon the characteristics desired as regards the coefficient of friction and the range thereof that operates to best advantage in the particular clutch in which it is employed. For instance, a composition which has given excellent results with the clutch as herein described contains approximately 65% copper, approximately 13.7% graphite, approximately 12% lead and approximately 7% tin. Iron to the extent of about 2.3% may also be present. Zinc may also be present to approximately an extent of 3.5%. The lead and/or tin in the material is believed to materially reduce the tendency of the linings to "score" or plate, or coat the surfaces of the plates with which they cooperate under slipping drive conditions and the proportions of these ingredients may be varied to produce the results desired.

It is to be noted that any binder of the conventional type is omitted, the absence of such a binding material permitting the structure and constitution of the lining to be accurately controlled throughout its processing, with the result that a product is obtained having a predetermined range of coefficient of friction which rises uniformly in proportion to the increase in applied pressures to which it is subjected in operation in automatic clutches. The ability to dispense with a binder is due, not only to the character and form of the metal powder, but is also due to its pure state, all foreign substances and impurities being eliminated. The mass formed under pressure without the binder is sufficiently strong to be handled for heat-treatment and by reason of the absence of the binder which is usually of such a nature as to be materially changed in character by the heat-treatment, the physical characteristics of the material do not change by reason of the treatment other than to improve the bonding between the ingredients through the ability of the feathery or sponge-like grains of the copper powder to knit closer with the other ingredients by reason of the molecular acceleration of the ingredients induced by the heat. The elimination of the binder also reduces the cost of manufacture and weight of the finished article.

After mixing in the desired proportions, the material is molded or otherwise pressed to form the shape desired for the final product at a pressure of approximately one ton per square inch. The heat treating step which follows may be effected before the material is applied to the clutch, or similar element or the element may be first applied and subsequently subjected to the heat treatment. In heat treating the material, the sheets or forms are placed in suitable ovens or furnaces and subjected to a reducing atmosphere at temperatures ranging from 50 to 70% of the melting temperature of the ingredients which in the case of the specific example cited above is from 1200° to 1300° F. The temperatures chosen in connection with such heat treating are preferably sufficiently high as to be above any temperatures that are encountered by the lining material in connection with its use in clutches and similar elements so that no possibility exists for the material to subsequently break down in operation, or undergo harmful changes in character by reason of the temperatures experienced.

It has been found that by reason of the characteristics of the materials going into the initial mix as previously described that each particle is in a state of internal stress similar to that in any product being cold worked and the effect thereof is to greatly enhance the recrystallization of the material during heat treatment, permitting a marked reduction in the length of the period required for heat treating and producing a light, tough, strong metallic composition. Further, the absence of binders which will not withstand heat, permits heat treatment at higher temperatures than has hitherto been thought possible which enables the material to be better conditioned for use in the friction assemblies.

It has further been found that as a result of the chemically pure, closely bonded mixture of materials and their intimate and interlocked contact, very clean and smooth surfaces can be obtained on the lining which affords excellent heat radiation and rapid conduction of heat from the lining to its cooperating clutch plate whereby maintenance of the clutch or like element at relatively low temperatures is insured, particularly when employed in connection with a type of clutch such as is disclosed herein in which a predetermined amount of slipping attends the normal operation thereof.

It is preferred to conduct the heat treatment in a reducing atmosphere since oxidation of the elements is then avoided and little or no change in the proportion of ingredients takes place. The heat treated product as finally obtained is characterized by a multiplicity of small voids which not only decrease the density and lighten the material which is of decided advantage in clutch linings as previously pointed out, but also function in the control of a floating film of lubricant on the faces of the material exposed to frictional contact with adjacent portions of the clutch or like assembly. The number and size of the voids may be varied by a proportional variance of the pressure applied to form the product or by the incorporation in the initial mix of a material which, while withstanding the pressure applied in forming the product, vaporizes when subjected to the heat treatment, and thereby produces the voids.

As an evidence of the porosity of the material, the specific gravity thereof in the solid state is approximately 6.00 whereas in the powdered state, the specific gravity is approximately 8.00. This difference in specific gravity of the material when in solid and powdered state proves the existence of the voids previously mentioned to a considerable extent.

Although I have described and prefer to utilize copper particles having spongy or feathery properties, it is to be understood that my invention contemplates the use of solid or dense copper grains or particles, of a size sufficiently small to insure their bonding or adhesion during processing of the facings, and the appended claims are intended to embrace linings of this character.

Referring again to Figure 1, 14 designates the clutch disk, part of which has been omitted in the drawing. Disk 14 is preferably provided at its periphery with a series of radially extending notches or slots 124 which divide the portion adjacent the periphery into a plurality of individual sectors 125 formed integral at their innermost side with plate disk 14. A series of apertures 126 are formed in the disk 14 in spaced concentric relation to assist in cooling the plate and to keep the weight at a minimum.

Facing 15 is formed as previously described in the same shape as sector 125. As the facing or lining is characterized by a low c. of f. (coefficient of friction), which is desirable for proper operation of the slipping drive, it has been found desirable to increase the c. of f. of the face contacting with sector 125 either by increasing the c. of f. of the lining 15 or by increasing the c. of f. of the adjacent face of sector 125. The surface of sector 125 may be sand-blasted as for example as indicated at 127, thus producing a surface of extreme roughness against which the low c. of f. lining is forced thereby producing resultant contact which produces a strong interlock and prevents relative motion between the elements.

In addition to this means of preventing slippage, holes 128 are preferably formed at spaced points on sector 125, like holes of substantially the same exact size being formed in lining 15. Since lining 15 is of metal, clean and accurately sized holes can be provided therein in contradistinction to the holes in a fabric or woven lining. Whereas with previous methods of fastening metallic linings to clutches and the like, rivets have been employed in connection with sized apertures, the same principles have been followed as employed in connection with the riveting of fabric linings and no particular effort has been made to accurately size and align the holes, at the same time choosing a rivet also of the exact size so that a maximum resistance to shearing can be built up in view of the increased surface contact between the shank of the rivet and the parts with which it is associated. It has been found that such prior methods as used in connection with metallic linings, particularly those of a low c. of f., are unsatisfactory as the lining pulls away from the rivet and the shearing forces cause the lining to crack and break.

By accurately dimensioning the holes in both the lining and the sector to which it is to be applied together with the employment of a rivet of special design, the linings may be quickly secured to the sectors and have no tendency to crack or slip when subjected to the stresses occasioned in actual operation. In fact some such linings secured in this manner have been installed in clutches employed in heavy duty buses and up to the time of filing of this application have gone over 40,000 miles with no ill-effects.

In riveting the lining to sector 125, lining 15 is bored and countersunk as shown in Figure 2 at 129. Rivets of the type shown in Figure 3 at 130 are then introduced into the apertures, the outer ends being peaned or expanded to lock lining 15. Rivets 130 are preferably formed of soft, ductile material such as annealed copper or brass and are cylindrical in shape, the ends thereof being bored out as indicated at 131 for a predetermined distance into the body of the rivet to facilitate expanding and enlargement of the head.

In Figure 4, a further method of mounting lining 15 to sector 125 is shown. In this method, all steps are substantially the same as with the method of Figures 1, 2 and 3 with the exception that instead of sand-blasting, the face of sector 125 is knurled or otherwise roughened to increase the c. of f. as indicated at 132, thereby preventing the lining from slipping thereon.

In Figures 5 and 6, a further manner of securing the linings to the clutch disk or like element is shown. Disk 14 is provided with sectors 125 and linings 15 are provided to substantially match therewith in shape. As shown in Figure 6, lining 15 has protuberant lugs 134 formed preferably integral therewith and aligned with holes 135 in sector 125. Lugs 134 engage holes 135 and in so doing prevent slippage between the lining and the face of the sector. Such lugs may be formed of the lining material or may be of other material and cast or molded therewith. Rivets 130 are preferably employed in combination with such lugs to maintain the lugs in position in the holes when no pressure is being exerted against the clutch face as when in the idling position.

In Figure 7 a modified form of fastening means is disclosed wherein driving lugs formed on the clutch plate are utilized to secure the linings thereto. A number of driving lugs, one of which is shown at 136, are positioned at various points on the sector of a clutch plate designed to be covered by the lining. Each lug comprises a small neck portion 137 of reduced diameter and opposing extending portions 138 which are preferably exactly dimensioned. The lining sector 15 as indicated at 139 is formed with accurately dimensioned holes corresponding to portions 138 which extend therein when the lining is mounted in its proper position. Lugs 136 are preferably so positioned that lining sectors 15 of the same shape are interchangeable and may be used on opposite sides of the clutch plate sector, thus avoiding a multiplicity of dies and molds to produce lining sectors of different shape with the holes therein in different positions.

While in Figures 1 and 4 I have shown the coefficient of friction between the lining and the sector of the clutch disk as increased by sand-blasting or knurling of the disk face, it is to be understood that other means may be employed. For instance in Figure 8 I have shown a section of a lining sector adapted for attachment to a smooth faced clutch plate which has neither been sand-blasted, knurled or otherwise roughened. The outer face of lining 15 as indicated at 140 is of the normal composition of the material and possesses a relatively low coefficient of friction. The opposite face which is designed to contact with the face of the clutch sector is impregnated with a composition as indicated at 141 such as fuller's earth which is designed to increase the coefficient of friction considerably whereby slippage between the clutch sector and the lining is prevented.

The increase in the coefficient of friction of the face of the lining which is adjacent the clutch or like element is of marked advantage especially when securing a material which is relatively soft and characterized by a low coefficient of friction. Creepage of the lining sectors on the clutch plate is eliminated thereby removing the shearing stress imposed upon the rivets during periods of high slippage as are encountered in slipping drives of the type described herein and in the above referred to application. Radial slippage of the lining sectors, due to the high centrifugal force acting on the clutch which exists when shifting gears at high engine speed, is also eliminated.

It is to be understood that although the herein described methods of securing frictional facings to supporting members has been illustrated in connection with securing clutch facings to the driven disk of automatic clutch, they may be advantageously employed for securing frictional elements to any support, such as clutch shoes, brake shoes and similar elements, whether they be of disk-like or cylindrical configuration.

With regard to the use of driving lugs mounted in the clutch sectors which engage apertures formed in the lining material, it is preferable that such lugs be formed of relatively soft material so as not to wear or score the adjacent pressure plates of the clutch should the lining become unduly worn.

It has also been found possible to fasten the lining sectors to the sectors of the clutch plates by the use of liquid compounds which are not affected by the temperatures to which the clutches rise in operation. Such compounds may depend upon their adhesive qualities for preventing slippage or may increase the coefficient of friction between the lining and the clutch plate sufficiently to overcome any tendency to slip.

While the lining has been illustrated as applied to a clutch disk of the segmental plate or sector type, it is to be understood that it may be applied to other types of clutch disks or shoes. It moreover may be applied to the driving plates or members of the clutch, if desired, and be adapted to cooperate with a driven disk which has no lining secured thereto, and the appended claims are intended to embrace assemblies of this character. However, the employment of such lining in connection with plates of the sector type is particularly advantageous since the various sectors with the notches therebetween act to cool the lining surfaces and keep the temperature down. The passage of air through the clutch is encouraged by reason of the rotation of the clutch which acts to keep the contacting surfaces thereof clean. However, it has been found that special ventilating features found essential to proper operation of conventional type facings in slipping drives may be eliminated when using a lining of the present invention, not only by reason of its heat-resistant qualities but due to its relatively high coefficient of thermal conductivity whereby the heat generated is immediately communicated to the adjacent portions of the clutch assembly and transferred to a suitable port of dissipation. The sector type of plate as employed in connection with the present lines is also of marked value in that the relatively small sectors applied as compared to a solid band of material have no tendency to warp and buckle; and since a certain portion of the facing that would otherwise occupy the grooves between the sectors is eliminated, the weight of the clutch disk is correspondingly reduced. If desired the portions of the disk removed to define the sector foundations may be bent up along the edges of the lining sectors to form a lip and further retain them in position.

Although I prefer to employ the herein disclosed methods of securing the lining to the clutch parts, it is to be understood that any other suitable means may be employed, and satisfactorily operating clutch mechanisms obtained.

Although the present disclosure relates to mechanisms of the "single plate" type, i. e., clutch mechanisms having two driving members and a single driven member, it is to be understood that the present invention contemplates clutch mechanisms wherein three or more driving members cooperate with two or more driven members to effect a driving connection between the driving and driven shafts.

After assembly, it has been found that a clutch faced with the material described herein, slips under practically all pressures applied for a short period of time after which it comes to what is termed a "set", no slipping thereafter taking place at automatic clutch full driving pressures. During this slipping and stabilizing stage, the surface of the material contacting with the pressure plates, or other driving means of the clutch, wears away to a limited extent thereby removing any excess lubricant that may have been forced to the surface as a result of a pressure applied in molding or as a result of the heat treatment. "High" particles of the metal are also removed. While a certain amount of material is worn away, it has been found that there is a tendency for the material to also build up until an equalization is obtained over the entire surface of the facing with the required portions of the lubricant and metal in equilibrium with one another thus providing the coefficient of friction desired. As there is preferably no binder present, the only constituents involved in establishing the desired equilibrium or "set" are the lubricant and the metal. Accordingly, since the proportions and physical characteristics of each may be accurately determined and controlled through the processing of the lining, it follows that a lining with a predetermined c. of f. which will remain constant, can readily be obtained.

If desired the linings may be "set" or stabilized before or after they are mounted on the clutch disc or similar element, and before they are assembled in the mechanism, by holding them in any desired manner and subjecting them to the pressures and slippage that they normally encounter during operation of the mechanism in which they are to be incorporated. By following this procedure the linings may be stabilized by the manufacturer and shipped for immediate use in the mechanisms in which they are to be installed.

The completed facing, after it has been heat treated and "run in" or "set", preferably has a coefficient of friction in the neighborhood of 0.15, measured under actual operating conditions or conditions comparable thereto, although the particular value may be greater or less in some instances, depending upon the size of the clutch with respect to the power it is called upon to handle in a particular installation and the particular operating characteristics desired. For instance, if the clutch is of a capacity greater than the power involved in a particular drive, it is possible to successfully handle the load with linings having a coefficient of friction slightly greater than that above given. The coefficient of friction may be varied by varying the percentage of the ingredients of the lining, but it is preferably held approximately to 0.15 because an increase above this value has a tendency to cause the metallic element of the lining to "plate" or coat the surfaces of the automatic plate and the flywheel, and a decrease below this value makes it necessary to employ heavy plate pressures to secure non-slipping drive. The coefficient of friction manifests a tendency to decrease when the temperature of the linings rises during slipping drive conditions but the magnitude of this change is not sufficient to be disadvantageously reflected in the operation of the device, but on the contrary, this characteristic of the material is believed to exert a beneficial influence under certain operating conditions.

The coefficient of friction just referred to is the desired coefficient, and when it is measured under laboratory conditions it ranges in the neighborhood of 0.2, although it may vary to some extent, depending upon the temperature of the material while it is undergoing tests, the character of the lubricant and other factors. For instance several different lining materials having the desired operating characteristics for one particular job may nevertheless have different values of frictional coefficient, depending upon the ratio of the graphite content to that of the other lubricants (lead, etc.) utilized in the material. In prior automatic clutches, the frictional coefficient of the linings used has ranged in the neighborhood of 0.3 but such clutches did not function as slipping drives, because the plates were brought together and picked up the load with a minimum of slippage, and the automatic mechanism was accordingly employed solely as an engaging and disengaging medium and did not smoothly build up slippage controlling pressures and establish as smoothly slipping, power transmitting connection between the prime mover and the load, as is effected by the present invention.

Although I have illustrated my invention in connection with a specific form of automatic or self-operating clutch, it is to be understood that my novel lining and driven plate assembly may be employed in any type of automatic or self-operating clutch, having slipping drive operating characteristics, whether the plates or frictional elements are brought together by vacuum, oil or air pressure or any type of centrifugally operable mechanism, and the appended claims are intended to embrace the use of my invention in such mechanisms.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An assembly comprising a relatively soft, metallic molded friction face having a relatively low coefficient of friction in combination with an element, said face being of substantially the same shape as said element, abrasive material on the element side of said face to increase the coefficient of friction thereof, corresponding apertures and lugs provided in conjunction with said face and said element to prevent relative movement therebetween when assembled, said lugs being formed of relatively soft material to prevent excessive wear on elements designed to cooperate with said assembly in operation.

2. A friction element for use in clutch mechanisms and the like comprising an element of relatively soft, metallic material characterized by a relatively low coefficient of friction, one face of said element having an extraneous material of a relatively high coefficient of friction secured thereto.

PAUL H. BREHM.